Nov. 4, 1952 — D. N. LAUDER — 2,616,952
COMBINATION PENLITE VOLTAGE AND CONTINUITY TESTER
Filed July 14, 1947 — 2 SHEETS—SHEET 1
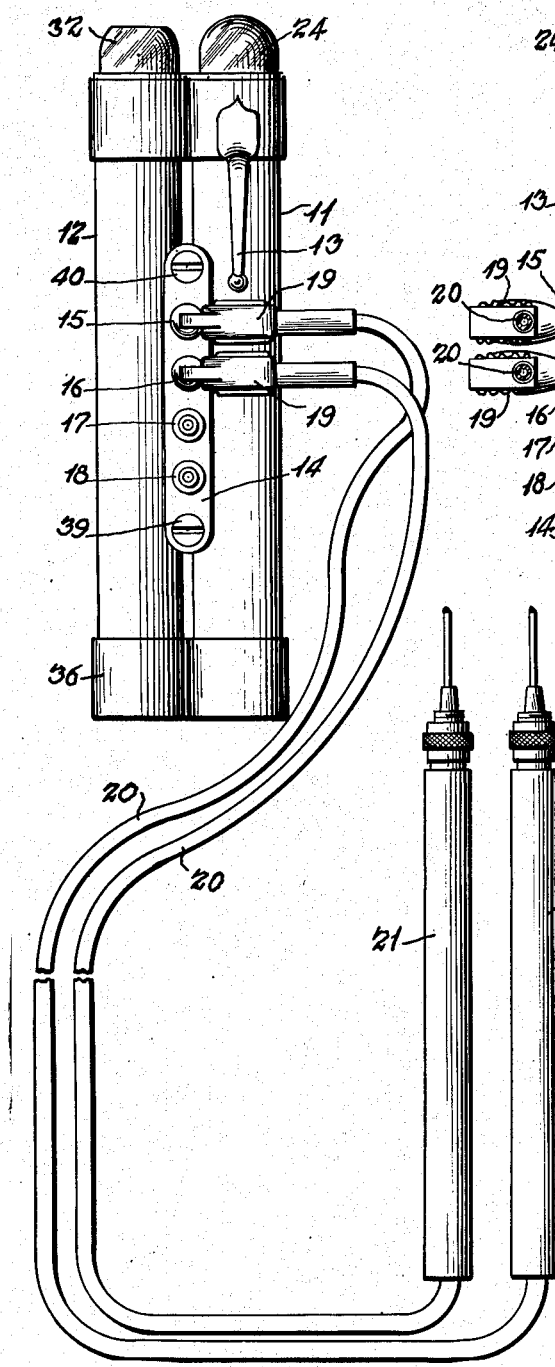
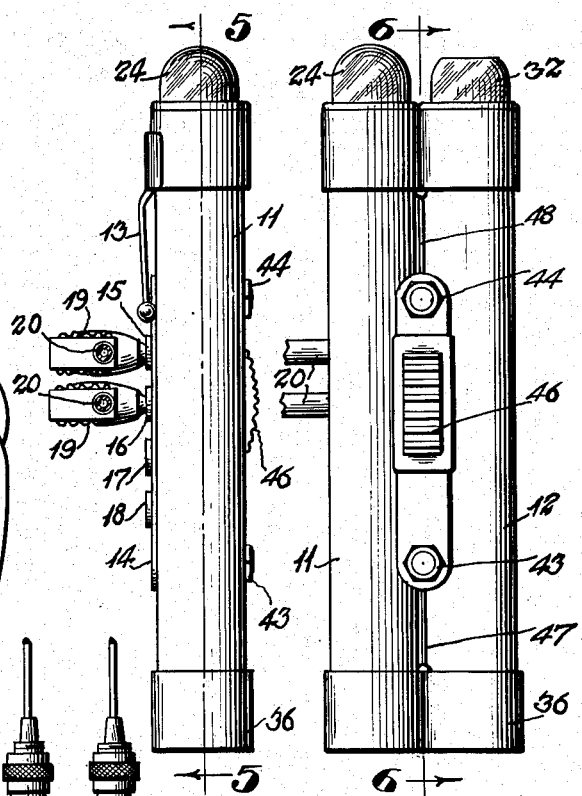
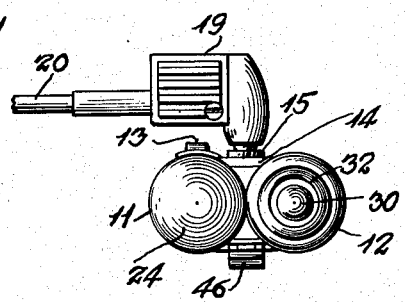
INVENTOR.
David N. Lauder.
BY Victor J. Evans & Co.
ATTORNEYS Nov. 4, 1952     D. N. LAUDER     2,616,952
COMBINATION PENLITE VOLTAGE AND CONTINUITY TESTER
Filed July 14, 1947     2 SHEETS—SHEET 2

INVENTOR.
David N. Lauder.
BY Victor J. Evans & Co.
ATTORNEYS

Patented Nov. 4, 1952

2,616,952

UNITED STATES PATENT OFFICE 2,616,952

COMBINATION PENLITE VOLTAGE AND CONTINUITY TESTER

David N. Lauder, Dumont, N. J.

Application July 14, 1947, Serial No. 760,767

1 Claim. (Cl. 175—183)

The present invention relates to electrical testing apparatus and more particularly to apparatus of this type which is portable and arranged to be of dimensions comparable with those of a pencil or fountain pen and which will therefore be suitable for carrying conveniently in the vest pocket or similar.

It is an object of the invention to provide an electrical tester which combines in a single pocket size unit the usual facilities for checking the presence of operating voltage over a relatively wide range and which also includes apparatus for the testing of electrical continuity.

A further object of the invention is to provide a tester of this character which may also be used as a flashlight.

Other and further objects will become apparent upon reading the following specification together with the acompanying drawing forming a part hereof.

Referring to the drawing:

Fig. 1 shows a front view in elevation of an embodiment of the invention.

Fig. 2 is a side view of the device shown in Fig. 1.

Fig. 3 is a rear view.

Fig. 4 is a plan view.

Fig. 5 is an enlarged sectional view taken along the line 5—5 of Fig. 2 looking in the direction of the arrows.

Fig. 6 is an enlarged sectional view taken along the line 6—6 of Fig. 3, looking in the direction of the arrows.

Fig. 7 shows a removable connector for use with the test leads of the invention.

Fig. 8 shows a schematic circuit diagram of the tester.

Referring to Fig. 1, the invention comprises a pair of tubular barrels 11 and 12. Barrels 11 and 12 are suitably fastened together and barrel 12 is provided with a pocket clip 13 of the type commonly used for pens, pencils, and the like. A terminal block 14 of insulating material is provided with four terminal jacks 15, 16, 17 and 18 the removable test plugs 19 being shown connected to jacks 15 and 16 which are used for voltage testing. Jacks 17 and 18 are used for continuity tests. Flexible test leads 20 are connected to plugs 19 and terminate in test prods 21.

A miniature neon lamp 22 is mounted in suitable socket 23 which is shown as being of the bayonet type, and is provided with terminals 25 and 26. A transparent dome shaped cap 24 covers the end of lamp 22 and is threadedly secured in the upper end of barrel 11. Terminal 25 is connected through a resistor 27 to test jack 16 via conductor 28 which is shown constructed integrally with resistor 27. Terminal 26 of socket 23 is connected by conductor 29 to test jack 15. When the test plugs 19 associated with test leads 20 are inserted in jacks 15 and 16, voltage tests may be made by means of test prods 21. The resistor protects lamp 22 when testing at higher voltages such as those in the neighborhood of 600 volts. The resistor, however, does not prevent the lamp from glowing at lower voltages such as those in the vicinity of 100 volts.

Mounted in the upper end of barrel 12 is a miniature incandescent lamp 30 which is held in socket member 31 of conducting material. A guard ring 32 partially encloses lamp 30 and is open at its upper end. Enclosed in barrel 12 are two flashlight cells of usual construction 33 and 34, the upper end of cell 33 being urged into contact with the central tip of lamp 30 by spring 35. Conducting base 36 is connected to the lower end of cell 34. A screw 38 is threaded in conductive plug 37 and serves to guide coil spring 35. Electrical contact with the lower end of cell 34 is established with conducting base 36 through spring 35 and plug 37.

Insulating plate 14 is secured against barrels 11 and 12 by screws 39 and 40. Screws 39 and 40 are attached to plates 41 and 42 respectively by nuts 43 and 44. A switch member 45 establishes contact between the plates 41 and 42 when moved to its lower position by movement of insulating operating member 46. In the lower position an electrical circuit from screw 39 to screw 40 is completed through plates 41 and 42 and contact member 45. Screw 39 is connected through conductor 47 to conducting base 36 and conductor 48 completes the circuit to socket 31. This completes the circuit from the battery to the lamp 30 permitting the device to be used as a flashlight.

For continuity testing, switch 45—46 is left open so that lamp 30 is deenergized. The lower end of cell 34 is connected to test jack 18 by conductor 49 and test jack 17 is connected to socket 31 by conductor 50. This establishes a circuit which may be completed to light lamp 30 by connecting test jacks 17 and 18 together. By moving plugs 19 into jacks 17 and 18, lamp 30 will light whenever continuity is established between test prods 21.

I have shown what I believe to be the best embodiment of my invention. I do not wish, however, to be limited to the embodiment shown but

I claim:

In an instrument for testing lamp means of different operating voltages, the improvement comprising a pair of body members, a dual cap and a dual base for securing the opposite ends of the body members in spaced relation to each other, a panel of insulating material abutting the members on one side thereof and a pair of plates of conductive material abutting the opposite sides of the body members, means passing through said panel and said plates for holding the same in fixed relation to each other and to the body members, a lamp means of high operating voltage mounted in one of said body members, two pairs of test jacks on said panel, a lamp means of high operating voltage mounted in one of said body members, connections extending from one pair of the test jacks to the lamp means of high operating voltage, a second lamp means mounted in the other of said body members a source of energy for operation of the second lamp means upon the establishment of a circuit between the other pair of test jacks and a switch means mounted on the plates for controlling the source of energy to said second lamp means.

DAVID N. LAUDER.

REFERENCES CITED

The following references are of record in the file of this patent:

UNITED STATES PATENTS

| Number | Name | Date |
|---|---|---|
| 1,109,450 | Mitchell | Sept. 1, 1914 |
| 1,528,709 | Trimble | Mar. 3, 1925 |
| 2,023,916 | Dante | Dec. 10, 1935 |
| 2,041,614 | Lindsay | May 19, 1936 |
| 2,156,319 | Steele | May 2, 1939 |
| 2,231,660 | Carlotti et al. | Feb. 11, 1941 |
| 2,413,484 | Berger | Dec. 31, 1946 |
| 2,418,872 | Fisher | Apr. 15, 1947 |

FOREIGN PATENTS

| Number | Country | Date |
|---|---|---|
| 77,819 | Switzerland | June 1, 1918 |
| 259,275 | England | Sept. 20, 1926 |
| 427,349 | Germany | Mar. 30, 1926 |